(12) United States Patent
Russell

(10) Patent No.: US 10,807,711 B2
(45) Date of Patent: Oct. 20, 2020

(54) UNMANNED AERIAL VEHICLES

(71) Applicant: Iain Matthew Russell, London (GB)

(72) Inventor: Iain Matthew Russell, London (GB)

( * ) Notice: Subject to any disclaimer, the term of this patent is extended or adjusted under 35 U.S.C. 154(b) by 75 days.

(21) Appl. No.: 16/048,231

(22) Filed: Jul. 28, 2018

(65) Prior Publication Data

US 2019/0031343 A1 Jan. 31, 2019

(30) Foreign Application Priority Data

Jul. 31, 2017 (GB) .................................. 1712322.5
Feb. 7, 2018 (GB) .................................. 1802013.1

(51) Int. Cl.
| | | |
|---|---|---|
| *B64C 39/02* | (2006.01) | |
| *B08B 3/02* | (2006.01) | |
| *B08B 3/04* | (2006.01) | |
| *B08B 3/00* | (2006.01) | |
| *B60S 3/04* | (2006.01) | |
| *B08B 13/00* | (2006.01) | |

(Continued)

(52) U.S. Cl.
CPC ............ *B64C 39/024* (2013.01); *B08B 13/00* (2013.01); *B60S 3/04* (2013.01); *B60S 3/045* (2013.01); *B60S 3/06* (2013.01); *B64D 1/16* (2013.01); *A47L 2201/00* (2013.01); *B08B 3/02* (2013.01); *B08B 3/04* (2013.01); *B64C 2201/024* (2013.01); *B64C 2201/126* (2013.01); *B64C 2201/128* (2013.01); *B64C 2201/141* (2013.01)

(58) Field of Classification Search
CPC ......... A47L 2201/00; B08B 3/02; B08B 3/04; B08B 3/045; B08B 3/06; B08B 13/00; B64C 39/024; B64C 2201/024; B64C 2201/126; B64C 2201/128; B64C 2201/141

See application file for complete search history.

(56) References Cited

U.S. PATENT DOCUMENTS 9,471,059 B1 10/2016 Wilkins
9,753,461 B1 * 9/2017 Johnson ................ B64C 39/024
(Continued)

FOREIGN PATENT DOCUMENTS

CN 205499327 U 8/2016
WO 2015150529 A1 10/2015
(Continued)

OTHER PUBLICATIONS

Keith Hopkin; "A drone to wash your car"; www.mashable.com/2016/10/28/drone-car-wash/; published Oct. 28, 2016; retrieved Jul. 28, 2018.

*Primary Examiner* — Joshua E Rodden

(57) ABSTRACT

An unmanned aerial vehicle, UAV, includes (i) a camera having a field of vision including, in use, a portion of a vehicle to be cleaned, (ii) a liquid container comprising waterless carwash liquid, (iii) a liquid dispenser operable to cause the waterless carwash liquid comprised in the liquid container to be dispensed from the liquid container, (iv) a cleaning implement, and (v) a controller communicatively coupled to the camera, the liquid dispenser and the cleaning implement. The controller is operable (a) to cause the liquid dispenser to dispense the waterless carwash liquid from the liquid container onto the portion of the vehicle to be cleaned and (b) to control the cleaning implement to clean the portion of the vehicle to be cleaned.

18 Claims, 1 Drawing Sheet

(51) Int. Cl.
*B64D 1/16* (2006.01)
*B60S 3/06* (2006.01)

(56) References Cited

U.S. PATENT DOCUMENTS

| | | | | |
|---|---|---|---|---|
| 9,828,094 | B2* | 11/2017 | McMillion | B64D 1/22 |
| 10,173,647 | B2* | 1/2019 | Elie | B08B 1/00 |
| 10,186,348 | B2* | 1/2019 | Davis | H01B 7/28 |
| 10,478,841 | B2* | 11/2019 | Harris | B05B 9/007 |
| 2015/0290348 | A1* | 10/2015 | Taoka | A61L 9/22 |
| | | | | 422/22 |
| 2015/0321758 | A1* | 11/2015 | Sarna, II | G05D 1/0011 |
| | | | | 244/63 |
| 2016/0052026 | A1 | 2/2016 | Chin et al. | |
| 2016/0260207 | A1* | 9/2016 | Fryshman | G06T 7/0008 |
| 2017/0121019 | A1* | 5/2017 | Shin | B64C 39/024 |
| 2017/0129099 | A1 | 5/2017 | Alduaiji et al. | |
| 2017/0129605 | A1* | 5/2017 | Wu | B05B 9/0413 |
| 2017/0197713 | A1* | 7/2017 | Borman | A47L 5/12 |
| 2017/0210470 | A1* | 7/2017 | Pardell | B08B 1/006 |
| 2017/0359943 | A1* | 12/2017 | Calleija | A01B 79/005 |
| 2018/0194464 | A1* | 7/2018 | Elder | B64C 39/022 |
| 2018/0208307 | A1* | 7/2018 | Boehme | B08B 1/002 |
| 2019/0009908 | A1* | 1/2019 | Perez Barrera | B64D 1/18 |
| 2019/0168875 | A1* | 6/2019 | Ashur | B64D 1/18 |
| 2019/0202554 | A1* | 7/2019 | Bosworth | B25J 5/00 |
| 2019/0246579 | A1* | 8/2019 | Anderson | A01G 25/02 |
| 2019/0247877 | A1* | 8/2019 | Fideler | B64C 39/024 |

FOREIGN PATENT DOCUMENTS

| | | | | |
|---|---|---|---|---|
| WO | 2017041269 | A1 | 3/2017 | |
| WO | WO-2017184898 | A1 * | 10/2017 | B08B 1/001 |
| WO | WO-2019032091 | A1 * | 2/2019 | B64C 39/02 |
| WO | WO-2019095135 | A1 * | 5/2019 | B64C 27/02 |

\* cited by examiner

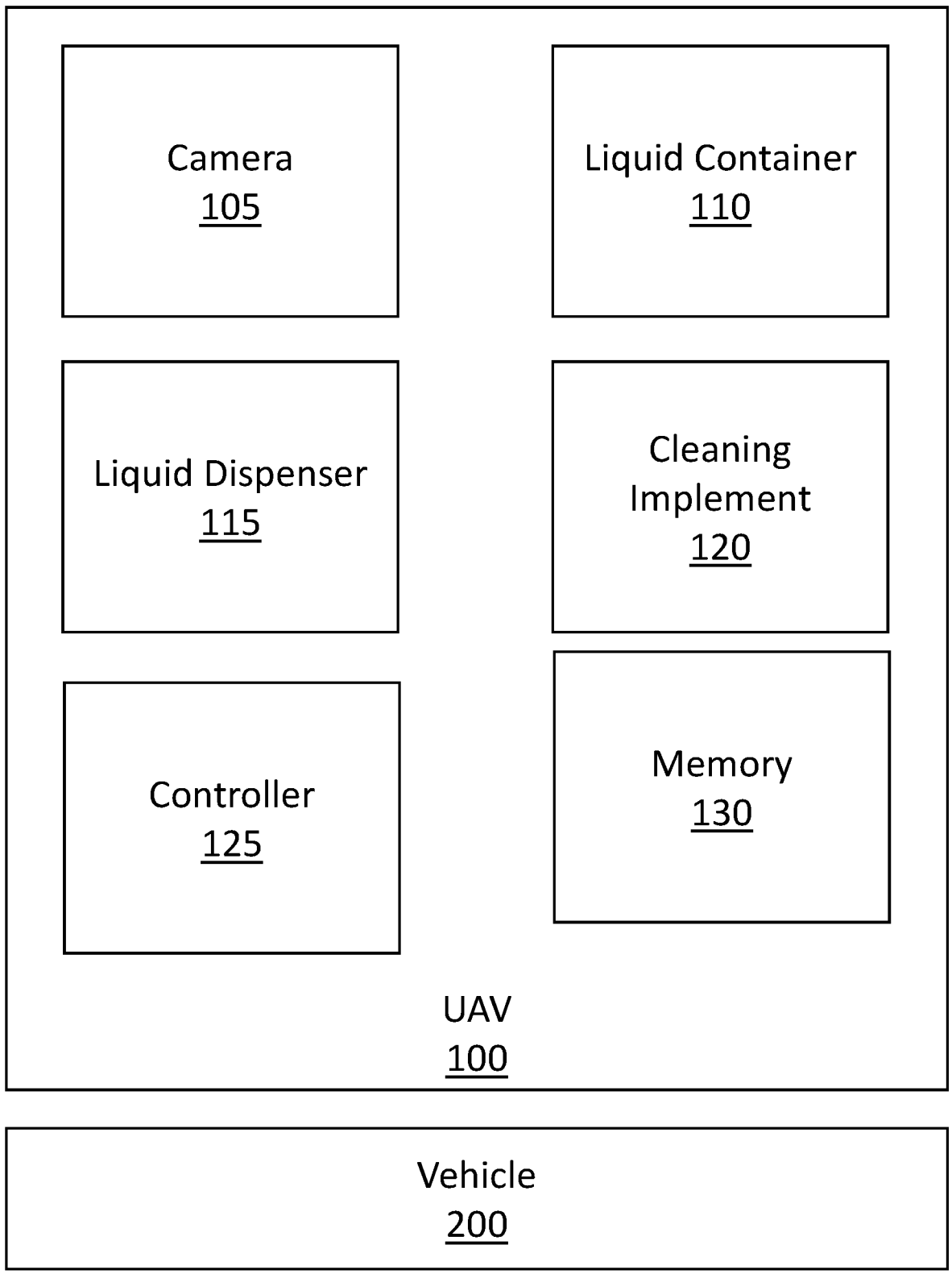

UNMANNED AERIAL VEHICLES

CROSS-REFERENCE TO RELATED APPLICATIONS

This application claims priority under 35 U.S.C. § 119(a) to UK Patent Application Nos. GB1712322.5, filed on Jul. 31, 2017, and GB1802013.1, filed on Feb. 7, 2018. The entire content of each of these patent applications is hereby incorporated by reference.

TECHNICAL FIELD

This disclosure relates to unmanned aerial vehicles (UAVs). In particular, this disclosure relates to UAVs, methods, controllers, and computer programs.

BACKGROUND

A UAV, which may also be known as a 'drone' or an 'unmanned aircraft system (UAS)', is an aircraft that does not have a human pilot aboard.

While many potential applications of UAVs have been envisaged, practical considerations and/or limitations of UAVs and/or potential applications have meant that use of UAVs for some potential applications has hitherto been impractical.

BRIEF DESCRIPTION OF FIGURES

Various features will now be described, by way of example only, with reference to the accompanying drawing in which:

FIG. 1 shows a block diagram of an example UAV in accordance with embodiments, and a vehicle.

DETAILED DESCRIPTION

The potential application of UAVs to vehicle-cleaning is known. However, known examples are at least partly impractical. In one such known example, a UAV carries a hosepipe to supply water to be used in cleaning the vehicle. This may require a user to attach the hosepipe to the UAV and to perform at least some of the vehicle-cleaning process manually. Having the hosepipe attached to the UAV also constrains movement of the UAV. The hosepipe may also scratch paintwork of the vehicle. A hosepipe full of water can also be relatively heavy and represents extra weight for the UAV to lift. Such a UAV can be unwieldy, difficult to control, inefficient etc.

A UAV may comprise a container to store the water to be used in cleaning the vehicle, such that a hosepipe is not needed. However, this may result in an impractically large UAV. This is because cleaning a typical vehicle may involve using in the region of 20-250+ litres of water. It is believed that cleaning a vehicle may use around 400 litres of water where a bucket and hosepipe are used.

Examples described herein provide more practical measures for cleaning a vehicle using a UAV. The UAV may clean the vehicle in a relatively environmentally friendly manner as significantly less (or no) water is involved in cleaning the vehicle. A more compact UAV may be provided compared to a UAV that requires capacity to store 5-250+ litres of water. A UAV may be provided to clean a vehicle in less time than a UAV that has a container that stores only some of the water that may be required to clean a vehicle and therefore may need to be refilled during cleaning of the vehicle.

Measures are provided in this regard in which, instead of using water to clean the vehicle, waterless carwash is used. Waterless carwash liquid is also known as "spray-on carwash" and "no-water carwash". Waterless carwash can be used to clean various types of vehicle, and not just cars. Examples of such vehicles include, but are not limited to, vans, buses, lorries, aircraft, boats, trains, motorbikes, scooters, other UAVs etc. The vehicle cleaned by the UAV may be an autonomous vehicle, or otherwise.

A significantly smaller volume of waterless carwash is used to clean a vehicle than using non-waterless car wash. A UAV which uses waterless carwash to clean a vehicle can thus be more practical, economical, environmentally friendly and/or effective.

The UAV may clean the vehicle alone, or in cooperation with one or more further UAVs. The UAV may clean the vehicle in cooperation with one or more systems other than a UAV. For example, the UAV may clean the vehicle in cooperation with one or more ground-based systems. Examples of such systems include, but are not limited to, ground-based robotic systems.

Referring to FIG. 1, there is shown an example of a UAV 100. FIG. 1 also shows a vehicle 200. The UAV 100 may clean the vehicle 200.

The UAV 100 may be controllable to clean the vehicle 200 autonomously. The UAV 100 may be controllable to clean the vehicle 200 fully autonomously (i.e. without any user input) or semi-autonomously (i.e. with some user input). Autonomous cleaning of the vehicle 200 may result in improved user experience compared to a user being involved in controlling the UAV 100 to clean the vehicle 200 since the user can occupy themselves with other matters while the vehicle 100 is being cleaned. By cleaning the vehicle 200 autonomously, a vehicle owner (or other person who would typically clean the vehicle 200) may not need to be exposed to chemicals used during the vehicle-cleaning process, which may also provide health benefits to such people. Furthermore, times at which the vehicle 200 may be cleaned may be expanded. For example, the vehicle 200 may potentially be cleaned during the night, on public holidays etc, where a traditional vehicle-cleaning business may otherwise be closed. A 24-hour, seven-days-a-week service may thereby be provided. Further, the vehicle 200 may be cleaned in a location that is difficult or impossible for a human to access. For example, even where the vehicle 200 is parked very closely to other vehicles, the UAV 100 may still be able to clean the vehicle 200. The UAV 100 may be able to clean the vehicle 200 in a location in which drainage for water is not readily available. For example, the UAV 100 may be able to the vehicle 200 in a vehicle showroom. Instead of the vehicle 200 being driven outside of the vehicle showroom to be cleaned, the vehicle 200 may be cleaned in-situ in the vehicle showroom, even if drainage is not available there. This may significantly reduce cleaning time and disruption the vehicle 200 may not need to be moved around to enable its cleaning. The UAV 100 may be able to clean the vehicle 200 in a location where access to clean water is not available. This may include, for example, an arid location, a rural location, etc. UAV-based cleaning may also be effective where a vehicle owner is physically unable to clean the vehicle 200 themselves. Cleaning the vehicle 200 may involve cleaning a roof of the vehicle 200. This may be difficult for some vehicle owners, for example those who cannot easily reach the roof of the vehicle 200. In the case of tall vehicles (for example double-decker buses), the roof may be out-of-reach of a person, and non-UAV-based cleaning may involve using a ladder or platform to clean the roof, which can be somewhat unsafe. Deploying a UAV to clean such the vehicle 200 in such a scenario may this provide relatively safe vehicle-cleaning. The positive effects associated with the UAV 100 may depend, at least to an extent, on the nature of the vehicle 200.

The UAV 100 may be configured to clean the vehicle 200 in response to a trigger event. An example of such a trigger event is a predetermined time, for example time or day and/or day of week. For example, the UAV 100 may be configured to clean the vehicle 200 at 10:00 every Saturday. As such, a schedule may be set up for cleaning the vehicle 200. The UAV 100 may determine that it will take a given amount of time to fly to the vehicle 200 from a reference location, and may leave the reference location with enough time to arrive at the location of the vehicle 200 at the scheduled time, based at least in part on the given amount of time. For example, the UAV 100 may determine that it will take seven minutes to fly from a location in which a first vehicle is being cleaned to a location in which a second vehicle is to be cleaned at 10:00 and may leave the location of the first vehicle no later than 09:53, to be able to arrive at the location of the second vehicle on schedule. The UAV 100 may be able to determine the flight time based on the distance between the locations of the first and second vehicles and an estimated speed of the UAV 100 over that distance. Another example of such a trigger event is a request from an entity associated with the vehicle 200, an entity associated with the UAV, or another entity. For example, an owner of the vehicle 200 may summon the UAV 100 to clean the vehicle 200. Another example of such a trigger event is the UAV 100 determining that the dirtiness of the vehicle 200 exceeds a threshold dirtiness level. As such, the UAV 100 may proactively clean the vehicle 200. This may be effective where, for example, an entity associated with the vehicle 200 (for example an owner of the vehicle 200) is also associated with the UAV 100 (for example owns the UAV 100). The UAV 100 may be configured to monitor the dirtiness level of the vehicle 200, for example intermittently or periodically.

In this example, the UAV 100 comprises a camera 105. The camera 105 has a field of vision including, in use, a portion of the vehicle 200 to be cleaned. The camera 105 may be configured to detect electromagnetic radiation in the visible light and/or infrared part of the electromagnetic spectrum. The UAV 100 may comprise more than one camera. Where the UAV 100 comprises multiple cameras, the cameras may operate as a stereo pair. By capturing electromagnetic radiation in the infrared part of the electromagnetic spectrum, the UAV 100 may be able to determine heat profiles, temperatures etc.

In this example, the UAV 100 comprises a liquid container 110. The liquid container 110 may be an integral part of the UAV 100. This may provide a more reliable and easy-to-manufacture UAV 100 than if the liquid container 110 were removable from the UAV 100. In other examples, however, the liquid container 110 is removable from the UAV 100. This may facilitate refilling of the liquid container 110. The UAV 100 may comprise multiple liquid containers. Where the UAV 100 comprises multiple containers, the containers may comprise the same or different liquids.

In this example, the liquid container 110 is arranged to contain and, in use, does contain waterless carwash liquid. However, the liquid container 110 may be arranged to contain a different liquid in other examples. For example, a user (or another entity) can add the waterless carwash liquid to the liquid container 110. An example of another entity is an automated filling system. For example, the UAV 100 may be configured to fly to the automated filling system in response to a trigger event, whereupon the automated filling system can automatically fill the liquid container 110 with waterless carwash liquid. Examples of such a trigger event include, but are not limited to, the amount of waterless carwash liquid in the liquid container 110 dropping below a threshold level, a request from the automated filling system to return to the automated filling system etc. Waterless carwash liquid may be a high-lubricity liquid that uses chemicals to clean the vehicle 200. Waterless carwash liquid may also be used to wax the vehicle 200.

Waterless carwash liquid can be purchased in a ready-to-use or concentrated form. Waterless carwash liquid is particularly effective where the vehicle 200 is only lightly dirty.

The waterless carwash liquid may comprise (or may consist of) silicone-free waterless carwash liquid. Silicone-free waterless carwash liquid is believed to result in less potential damage to vehicle paintwork.

The waterless carwash liquid may comprise (or may consist of) volatile organic compound (VOC)-compliant waterless carwash liquid. VOC-compliant waterless carwash liquid is believed to enable relatively environmentally safe vehicle-cleaning.

The volume of the liquid container 110 may be insufficient to contain an amount of water required to clean the vehicle 200 using non-waterless carwash liquid. For example, the liquid container 110 may store at most 5 litres of liquid, which is believed to correspond to a practical minimum amount of water used to clean a typical car using non-waterless carwash liquid.

It is believed that around 150 millilitres of waterless carwash may be used to clean a typical car using waterless carwash. As such, in some examples, the liquid container 110 stores at least 150 millilitres of liquid. This would allow the UAV 100 clean a typical car without the need for the liquid container 110 to be refilled during cleaning. However, cleaning a typical car may involve around 500 millilitres of waterless carwash in some cases. The amount of waterless carwash used may depend on various factors. Examples of such factors include, but are not limited to, the type of waterless carwash, the size of the vehicle 200, the dirtiness of the vehicle 200 etc.

In some examples, the liquid container 110 stores at most 500 millilitres of liquid. This may allow the UAV 100 clean a particularly large and/or dirty car or multiple typical cars without the need for the liquid container 110 to be refilled during cleaning.

A liquid container 110 that is arranged to store a relatively small amount of liquid is likely to result in a lighter and more efficient UAV 100. However, providing a liquid container 110 that has a large enough volume to store sufficient waterless cleaning liquid to clean a typical car means that a UAV 100 with such a liquid container may be able to clean a typical car without having to have the liquid container 110 refilled partway through cleaning, which can reduce cleaning time, reduce power consumption, and/or improve user experience.

In this example, the UAV 100 comprises a liquid dispenser 115. The liquid dispenser 115 is operable to cause liquid to be dispensed from the liquid container 110. The liquid dispenser 115 may comprise a nozzle operable to cause liquid to be sprayed from the liquid container 110. However, the liquid dispenser 115 may be of a different type. For example, the liquid dispenser 115 may comprise a closable opening in the base of the liquid container 110. The opening may be opened to allow liquid to drop from the liquid container 110 onto the vehicle, for example through gravity, and may be closed to retain liquid in the liquid container 110.

In this example, the UAV 100 comprises a cleaning implement 120. The cleaning implement 120 is used to clean the vehicle 200.

The cleaning implement 120 may comprise microfiber cloth and/or terrycloth. Microfiber cloth and/or terrycloth may be particularly effective for cleaning the vehicle 200 using waterless carwash compared, for example, to a sponge and/or chamois leather. For example, microfiber cloth and/or terrycloth may have relatively high absorbance and softness, which can help to capture dirt particles on the vehicle 200 when waterless carwash liquid is used.

The cleaning implement may have a weight of at least 300 Grams per Square Metre (GSM). Using such a cleaning implement (which corresponds to relatively high-quality) may reduce a risk of scratching the vehicle 200 when using waterless carwash compared to using a cleaning implement having a weight of less than 300 GSM.

The UAV 100 may be configured to use a first part of the cleaning implement 120 until the first part of the cleaning implement 120 has a dirtiness level above a threshold level. The UAV 100 may be configured to use one or more further parts of the cleaning implement 120 until the one or more further parts have respective dirtiness levels above one or more respective threshold levels. Such process can be repeated. The cleaning implement 120 may comprise a roll of microfiber cloth and/or terrycloth where part of the microfiber cloth and/or terrycloth is used until it becomes dirty, whereupon a further part of the microfiber cloth and/or terrycloth can be drawn from the roll and used to clean the vehicle.

The UAV 100 may be configured to use a further cleaning implement 120 in response to determining that a currently used cleaning implement 120 has a dirtiness level above a threshold level. For example, the cleaning implement 120 may comprise a number of microfiber cloths and/or terrycloths and a fresh microfiber cloth and/or terrycloth can be used when a previous one becomes dirty.

As such, a desired cleaning level can be provided by using different parts of a cleaning implement 120 and/or multiple cleaning implements 120. A dirtied cleaning implement 120 may be discarded. Alternatively, a dirtied cleaning implement 120 may be cleaned and reused. For example, dirtied cleaning implement 120 may be washed, dried and then reused.

The cleaning implement 120 may comprise one or more cleaning tools in addition to or as an alternative to microfiber cloth and/or terrycloth, for example. An example of such a cleaning tool is a vacuum cleaner. The vacuum cleaner may be used to clean an interior of the vehicle 200, for example. Another example of such a cleaning tool is an air blower. The air blower may be used to blow dirt, leaves etc off the vehicle 200. The air blower may alternatively or additionally be used to cool the vehicle 200. This may provide more effective cleaning, as described in more detail below. Another example of such a cleaning tool is a steam-cleaning implement. Steam-cleaning may use some water, but less water than conventional hosepipe- and/or bucket-based vehicle-cleaning. Another example of such a cleaning tool is a window-cleaning implement. As such, one or more windows of the vehicle 200 may be cleaned. Another example of such a cleaning tool is a wheel-cleaning implement. As such, one or more wheels of the vehicle 200 may be cleaned.

Another example of such a cleaning tool is a tyre-spraying implement. As such, one or more tyres of the vehicle 200 may be cleaned. Another example of such a cleaning tool is a type pump implement. The type pump implement may be used to pump one or more tyres of the vehicle 200. The type pump implement may be operable to remove a hub cap of a tyre (for example by locating and rotating the hub cap to remove the hub cap, and then retain the removed hubcap), to inflate the tyre, and to replace the hub cap (for example by rotating the retained hub cap back onto the tyre). The type pump implement may be arranged to inflate the tyre to a predetermined pressure, for example where the tyre is under the predetermined pressure. The type pump implement may be arranged to deflate the tyre to a predetermined pressure, for example where the tyre is over the predetermined pressure. The predetermined pressure may be provided by an entity associated with the vehicle 200, an entity associated with the UAV 100, or otherwise. The UAV 100 may be able to determine the predetermined tyre pressure itself. For example, the UAV 100 may be able to access a database of predetermined tyre pressures for different vehicles. The UAV 100 may be able to recognise the make, model etc of the vehicle 200, for example by recognising one or more emblems on the vehicle 200, a shape of the vehicle 200 etc, and may be able to look up the predetermined tyre pressure for the vehicle 200 accordingly. The UAV 100 may take into account one or more other factors in determining the predetermined tyre pressure. Examples of such other factors include, but are not limited to, whether or not the tyre is a spare tyre, whether the tyre is a front or rear tyre, a level of loading of the vehicle 200, one or more indications provided on the tyre itself, etc. Although examples are described herein in which the type pump implement is used in conjunction with cleaning the vehicle 200, the tyre pump implement may be used independently in other examples. In some specific examples, the UAV 100 comprises the type pump implement and is not configured to clean a vehicle. This also applies in relation to the other example cleaning tools described herein.

In this example, the UAV 100 comprises a controller 125. The controller 125 may be embodied in hardware and/or software. The controller 125 may comprise a processor, microprocessor etc. The controller 125 may be arranged to execute computer-readable instructions comprised in a computer program and, thus, to cause the techniques described herein to be performed. The computer-readable instructions may be stored in one or more memories 130 of the UAV 100.

In this example, the controller 125 is communicatively coupled to the camera 105, the liquid dispenser 115 and the cleaning implement 120.

In this example, the controller 125 is operable to cause the liquid dispenser 115 to dispense liquid from the liquid container 110 onto the portion of the vehicle 200 to be cleaned. For example, the controller 125 may output a control signal to the liquid dispenser 115 to cause the liquid dispenser 115 to dispense the liquid.

In this example, the controller 125 is operable to control the cleaning implement 120 to clean the portion of the vehicle 200 onto which the liquid is dispensed. For example, the controller 125 may output a control signal to the cleaning implement 120 such that the cleaning implement 120 cleans the relevant portion of the vehicle 200.

The controller 125 may be configured to control the cleaning implement 120 to clean the portion of the vehicle 200 onto which the liquid is dispensed before the liquid dries on the portion of the vehicle 200. This provides particularly efficient cleaning where waterless carwash is used.

In this regard, the controller 125 may be configured to cause the UAV 100 to blow air over the portion of the vehicle 200 that is being cleaned to cool the portion of the vehicle 200 to be cleaned prior to causing the liquid dispenser 115 to dispense the liquid from the liquid container 110. For example, where the UAV 100 has rotors (for example in the case of a rotocopter), the rotors may serve to cool the portion of the vehicle 200 that is being cleaned prior to the waterless carwash liquid being dispensed to increase an evaporation time of the waterless carwash liquid, which may provide more effective cleaning. The UAV 100 may hover over or land on the vehicle 200 when cleaning the vehicle 200. Hovering over the vehicle 200 may present a risk of damage to the vehicle 200 should the UAV 100 fail. However, hovering over the vehicle 200 may reduce a risk of damage caused by contact with the vehicle 100 while cleaning where cleaning is performed in accordance with normal operation of the UAV 100.

The controller 125 may be configured to determine a temperature of the portion of the vehicle 200 that is being cleaned, or that is to be cleaned. Where the camera 105 of the UAV 100 is arranged to capture electromagnetic radiation in the infrared part of the electromagnetic spectrum, the UAV 100 may be able to determine the temperature based on the captured image data. However, the temperature may be determined in another manner. For example, the temperature may be determined using a contact-based temperature probe. Using captured image data, which may not involve physical contact with the vehicle 200, may be more effective in the context of vehicle-cleaning than use of a contact-based temperature probe, which would involve physical contact with the vehicle 200 (which may dirty, damage etc. the vehicle 200).

The controller 125 may be configured to cause the UAV 100 to blow air over the portion 200 of the vehicle that is being cleaned until the temperature of the portion of the vehicle 200 is below a threshold temperature level. This may enable the UAV 100 to provide relatively effective cleaning. However, this may increase cleaning time.

In some examples, the controller 125 causing the UAV 100 to blow air over the portion 200 of the vehicle involves any amount of air being blown over the portion 200 of the vehicle. The amount may be very small, such that only a very small cooling effect is provided. However, in other examples, more significant amounts of air can be blown to provide a more significant cooling effect. The cooling effect may be intentional or incidental on the part of the UAV 100.

The controller 125 may be configured to control the cleaning implement 120 to clean the portion of the vehicle 200 using linear cleaning motion. This reduces a risk of paintwork being scratched compared to circular motion where waterless carwash liquid is used.

The UAV 100 may hover over the vehicle 200 while the UAV 100 cleans the vehicle 200. By hovering over the vehicle 200, the UAV 100 itself does not dirty the vehicle 200 by physical contact with the vehicle 200, for example by one or more legs of the UAV 100 coming into contact with the vehicle 200.

The UAV 100 may land while the UAV 100 cleans the vehicle 200. By landing, the UAV 100 may conserve energy compared to hovering over the vehicle 200. In some examples, the UAV 100 may land on the vehicle 200 while the UAV 100 cleans the vehicle 200. If the landing of the UAV 100 on the vehicle 200 results in the UAV 100 dirtying the vehicle 200, for example by one or more legs of the UAV 100 coming into contact with the vehicle 200, the UAV 100 may hover over the vehicle 200 and clean the dirtied portion(s). In some examples, the UAV 100 may land on an object other than the vehicle 200 while the UAV 100 cleans the vehicle 200. For example, the UAV 100 may land on the floor while the UAV 100 cleans the vehicle 200. The UAV 100 may comprise one or more legs that enable the UAV 100 to land on the floor. The one or more legs may be telescopic, for example. Telescopic legs may be retracted while the UAV 100 is in flight to provide an aerodynamic profile for more efficient flying, and may be extended when the UAV 100 cleans the vehicle 200 to provide support and stability, for example.

The camera 105 may be configured to capture image data corresponding to the field of vision of the camera 105. The captured image data may comprise still image data and/or video data. The captured image data may be stored within the UAV 100. The captured image data may be transmitted to an entity other than the UAV 100. Examples of such entities include, but are not limited to, an entity associated with the vehicle 200 (for example an owner of the vehicle 200), an entity associated with the UAV 100 (for example an owner of the UAV 100) etc. The entity other than the UAV 100 may store the transmitted image data. The image data may be transmitted in real-time in some examples. This may enable, for example, an owner of the vehicle 200 to watch the UAV 100 clean the vehicle 200 when the vehicle 200 is in the process of being cleaned.

The image data may be captured before the UAV 100 has started cleaning the vehicle 200, while the UAV 100 is cleaning the vehicle 200, and/or after the UAV 100 has cleaned the vehicle 200.

Image data captured before the UAV 100 has started cleaning the vehicle 200 may be used to determine a level of cleanliness and/or or dirtiness of the vehicle 200. This may be compared to a threshold level as described above, or otherwise. The UAV 100 may be used to clean the vehicle 200 only when the vehicle 200 has a level of dirtiness below a predetermined threshold. Waterless carwash is especially, but not exclusively, effective when the vehicle 200 is lightly, rather than heavily, dirty. As such, the UAV 100 may be deployed where it is likely to be most effective. Avoiding cleaning the vehicle 200 and/or one or more parts of the vehicle 200 when highly dirty may be effective in reducing damage to the vehicle 200, for example paintwork of the vehicle 200, compared to not avoiding such cleaning. In some scenarios, cleaning the vehicle 200 and/or one or more parts of the vehicle when highly dirty may be premium service, for example in view of the additional material, time and/or care involved in cleaning. In other examples, UAV 100 may be used to clean the vehicle 200 only when the vehicle 200 has a level of dirtiness above a predetermined threshold. As such, the UAV 100 can be used to clean the vehicle 200 when the impact of the cleaning is likely to be most pronounced. In some examples, the UAV 100 can clean the vehicle 200 irrespective of the level of dirtiness of the vehicle 100.

Image data captured before the UAV 100 has started cleaning the vehicle 200 may be used to identify pre-existing degradation to the vehicle 200. The UAV 100 may be configured to recognise different types of predetermined degradation. This may involve the UAV 100 analysing the captured image data and recognising features in the captured image data that correspond to degradation. Degradation may correspond to damage, in some examples. Examples of types of degradation include, but are not limited to, scratches, bumps, dents, rust etc. Such image data may be stored and recalled if an entity, such as an entity associated with the vehicle 200 (for example an owner of the vehicle 200), alleges that the UAV 100 has caused degradation to the vehicle 200. Such image data may alternatively or additionally be provided to an entity, such as an entity associated with the vehicle 200 (for example an owner of the vehicle 200), prior to the UAV 100 cleaning the vehicle 200. For example, an entity associated with the vehicle 200 may be requested to acknowledge pre-existing degradation of the vehicle 200. Cleaning of the vehicle 200 may be conditional upon the entity associated with the vehicle 200 providing such acknowledgment.

Image data captured before the UAV 100 has started cleaning the vehicle 200 may be used to identify the vehicle 200. For example, the UAV 100 may be configured to clean the vehicle 200 and the UAV 100 may use such captured image data to identify the vehicle 200. This may, for example, be effective where the vehicle 200 is parked underground and where the UAV 100 has limited ability to determine its own location and/or the location of the vehicle 200, for example because GPS-based location techniques are ineffective. The UAV 100 may therefore still be able to identify the vehicle 200, using a non-location based technique. The vehicle 200 may be identified in various ways. The vehicle 200 may be identified based on a vehicle registration plate (also known as a "number plate" or "license plate"). The UAV 100 may be provided with a given vehicle registration plate identifier for the vehicle 200 and the UAV 100 may identify the vehicle 200 based on recognising the given vehicle registration plate identifier in the captured image data. The vehicle 200 may be identified based on one or more characteristics of the vehicle 200. Examples of such vehicle characteristics include, but are not limited to, make, model and colour. The UAV 100 may be provided with one or more given vehicle characteristics for the vehicle 200 and the UAV 100 may identify the vehicle 200 based on recognising the one or more given vehicle characteristics in the captured image data. The UAV 100 may be able to recognise the make and/or model of the vehicle 200 by identifying one or more emblems on the vehicle 200. For example, the UAV 100 may be configured to recognise an emblem with the manufacturer's logo and/or one or more emblems designating the model of the vehicle 200. Identifying the vehicle 200 may involve requesting confirmation that a vehicle suspected to be the vehicle 200 is the correct vehicle. For example, an entity associated with the vehicle 200 and/or an entity associated with the UAV 100 may be provided with the captured image data and/or data derived from the captured image data and be requested to confirm that the correct vehicle has been identified. The UAV 100 may be configured to await positive confirmation of the identity of the vehicle 200 before commencing cleaning of the vehicle 200. The UAV 100 may be provided with reference image data to enable the UAV 100 to recognise the vehicle 200. For example, one or more visual representations of the vehicle 200 may be provided to the UAV 100 to enable the UAV to recognise the vehicle 200. The one or more visual representations may comprise one or more photographs of the vehicle 200. The one or more photographs of the vehicle 200 may be provided by an entity associated with the vehicle 200, for example. The one or more visual representations may comprise one or more computer-generated representations of the vehicle 200. For example, providing a vehicle registration plate identifier may enable a computer-generated representation of the vehicle 200 to be generated by using the vehicle registration plate identifier to identify the make, model and/or colour of the vehicle 200. A computer-generated model of the vehicle 200 may then be generated based on these characteristics and provided to the UAV 100 to assist the UAV 100 in recognising the vehicle 200. For example, the UK's Driver & Vehicle Licensing Agency (DVLA) provides an online lookup service where at least the make and colour of the vehicle 200 may be retrieved by providing the vehicle registration plate identifier. Other service providers enable the model, year of first registration, number of doors, transmission type etc to be retrieved by providing the vehicle registration plate identifier. The profile of the vehicle 200 may be retrieved from a library and used in conjunction with the above-mentioned one or more characteristics. The vehicle 200 may be located based on data transmitted by the vehicle 200. For example, the vehicle 200 may broadcast a beacon enabling the UAV 100 to locate the vehicle 200. The UAV 100 may be able to locate the vehicle 200 by identifying a wireless network identifier of the vehicle 200 where the vehicle 200 broadcasts such data.

Image data captured while the UAV 100 is cleaning the vehicle 200 may be used to facilitate cleaning of the vehicle 200 by the UAV 100. For example, the UAV 100 may use such captured image data to determine which part of the vehicle 200 is being cleaned, to determine whether the part of the vehicle 200 has been cleaned to a satisfactory degree etc.

Image data captured while the UAV 100 is cleaning the vehicle 200 may be used to demonstrate how the cleaning is taking and/or took place. As indicated above, such captured image data may be relayed in real time. For example, an owner of the vehicle 200 may choose to watch the vehicle 200 being cleaned in real time, an owner of the vehicle 200 may have access to the captured image data after the vehicle 200 has been cleaned etc. In some examples, the image data is captured while the vehicle 200 is being cleaned, but is relayed or otherwise made available after the vehicle 200 has been cleaned. For example, such captured image data may be archived and made available on demand.

Image data captured after the UAV 100 has cleaned the vehicle 200 may be used to demonstrate that the vehicle 200 had been cleaned. This may be effective where, for example, the vehicle 200 subsequently becomes dirtier than it was after it had been cleaned by the UAV 100. For example, the vehicle 200 may become dirtier as a result of rain, passing vehicles etc.

In some examples, the UAV 100 is configured to operate such that the UAV 100 is not represented in the captured image data. Where, for example, the vehicle 200 has been cleaned and waxed, a reflection of the UAV 100 onto a part of the body of the vehicle 200 may otherwise be represented in the captured image data. Where the vehicle 200 includes a mirror, for example a wing mirror, a reflection of the UAV 100 may otherwise be represented in the captured image data. The UAV 100 may be configured to determine whether or not the UAV 100 is represented in the captured image data. In response to determining that UAV 100 is represented in the captured image data, the UAV 100 may take one or more predetermined actions. Examples of such actions include, but are not limited to, flying to a different position such that the UAV 100 is no longer represented in captured image data, cropping the captured image data so that the UAV 100 is not represented in the captured image data etc.

In some examples, one or both of the UAV 100 and the vehicle 200 transfers power to the other of the UAV 100 and the vehicle 200 while the UAV 100 is in the process of cleaning the vehicle 200. Such power transfer may occur before, during and/or after the vehicle 200 is being cleaned by the UAV 100. Such power transfer may be wireless and/or via a physical connection. For example, the vehicle 200 may provide power to the UAV 100 as a full or partial exchange for the UAV 100 cleaning the vehicle 200. Where, for example, the UAV 100 performs one or more tasks other than cleaning the vehicle 200, the UAV 100 may be rewarded for cleaning the vehicle 200 by receiving power from the vehicle 200 to enable the UAV 100 to perform the one or more other tasks. The UAV 100 may provide power to the vehicle 200 as an additional service, in addition to cleaning the vehicle 200. For example, a user of the vehicle 200 may wish the UAV 100 not only to clean the vehicle 200 but also to, at least partially, recharge the vehicle 200. Where, for example, the vehicle 200 is cleaned on a regular basis, additional recharging of the vehicle 200 by the UAV 100 may represent an appreciable reduced burden on an owner of the vehicle 200 in terms of charging the vehicle 200 over time.

The UAV 100 may comprise one or more solar power components. The one or more solar power components may comprise one or more solar panels. As such, the UAV 100 may be powered, at least partially, by solar power. This may be especially effective for a UAV 100 that is configured to clean one or more vehicles that tend to be outdoors when they are being cleaned, where solar power is more likely to be produced efficiently. This, coupled with the use of waterless carwash, further enhances the environmentally positive attributes of the UAV 100. The examples described herein are, however, not limited to outdoor vehicle-cleaning and, in some examples, the UAV 100 may sometimes or always clean vehicles in an indoor environment. For example, the indoor environment may correspond to a vehicle showroom, as described above. Vehicles in a showroom are less likely to become heavily dirtied than vehicles that are used outdoors, particularly outdoor vehicles that are used extensively outdoors. The UAV 100 may be particularly effective in such a scenario. For example, the UAV 100 may autonomously clean at least some of the vehicles in the vehicle showroom when the vehicle showroom is closed, and no staff or customers are present.

In some examples, the UAV 100 comprises one or more lights. The one or more lights may comprise one or more LEDs, for example. The one or more lights may be used to illuminate at least part of the vehicle 200 to be cleaned. This may enable the UAV 100 to clean the vehicle 200 in low-light conditions. Low-light conditions may arise at night, in bad weather, when the vehicle 200 is parked in an unlit location etc. This expands the opportunities for the UAV 100 to be able to clean the vehicle 200. Cleaning the vehicle 200 at night may enhance effectiveness of cleaning the vehicle 200. The vehicle 200 may be cooler at night and the likelihood of the cleaning liquid evaporating prematurely may be reduced, compared to cleaning the vehicle 200 in warmer conditions, such as during the day. However, the one or more lights may enhance performance outside of low-light conditions. For example, use of one or more high-powered lights in such scenarios may facilitate determination by the UAV 100 of portions of the vehicle 200 to be cleaned further where, for example, the high-powered light enables the UAV 100 to detect dirt that would not otherwise be visible. The one or more lights may be activated temporarily, for example where enhanced visibility of the vehicle 200 is effective.

Examples described above relate to a UAV 100 that is controllable to clean the vehicle 200 autonomously. In other examples, an object other than the UAV 100 may be used to clean the vehicle 200 in the manner described herein. For example, a non-aerial vehicle, such as a ground-based robotic entity, may be used. The ground-based robotic entity may be a ground-based robotic vehicle, or otherwise. However, the techniques described herein are particularly effective for aerial vehicles where weight considerations affect efficiency and, as such, where using waterless carwash liquid in the manner described herein is particularly effective. Nevertheless, a ground-based robotic entity using waterless carwash to clean the vehicle 200 may be relatively efficient compared to a ground-based robotic entity that performs water-based vehicle-cleaning.

Further the UAV 100 (or other object) may be controllable by a human operator (for example a ground-based operator) to clean the vehicle 200 in a non-autonomous manner. However, by cleaning the vehicle 200 autonomously, a person who may otherwise have had to control cleaning can be freed up to pursue other matters. Where the UAV 100 is controllable by a ground-based operator, the ground-based operator may, in some cases, have to maintain Visual Line of Sight (VLoS) with the UAV 100. This may provide relatively safe cleaning but may restrict the scenarios in which the UAV 100 can be used. Where the UAV 100 is controllable by a ground-based operator, the ground-based operator may, in some cases, have to control a maximum of one UAV at a time. This may provide relatively safe cleaning, since the operator will not be directed by control of other UAVs, but may restrict the number of UAVs that may be deployed to clean vehicles at the same time.

In examples described above, the UAV 100 comprises a camera 105 having a field of vision including, in use, a portion of the vehicle 200 to be cleaned. In other examples, another type of sensor may be used to detect a portion of the vehicle 200 to be cleaned. For example, an ultrasonic sensor may be used.

In examples described above, the UAV 110 comprises a liquid container 110. In other examples, the liquid container 110 may be provided separately from the UAV 100. A hose may run from the liquid container 110 to the UAV 100 via which waterless carwash liquid (or any other liquid) may be provided to clean the vehicle 200. However, this may limit manoeuvrability of the UAV 100, as described above.

In examples described above, the UAV 100 comprises a cleaning implement 120. In other examples, the cleaning implement 120 is separate from the UAV 100. For example, the UAV 100 may dispense liquid to clean the vehicle 200 and the liquid can be wiped by a user. The UAV 100 nevertheless facilitates cleaning of the vehicle 200 in such an example. For example, the user may be able to clean the vehicle 200 quicker than if they had to apply the liquid themselves.

In examples described above, the UAV 100 dispenses waterless carwash liquid. In other examples, another type of cleaning liquid may be used to clean the vehicle 200. The other type of liquid may be used as an alternative or, or in addition to waterless carwash liquid. An example of another type of liquid is water.

In examples described above, the UAV 100 is operable to clean the vehicle 200. However, the UAV 100 may, alternatively or additionally, be operable to clean another type of object. An example of another type of object is a window.

Various measures (for example UAVs, methods, controllers and computer programs) are provided. The UAV 100 comprises a camera 105 having a field of vision including, in use, a portion of a vehicle 200 to be cleaned. The UAV 100 comprises a liquid container 100. The UAV 100 comprises a liquid dispenser 115 operable to cause liquid to be dispensed from the liquid container 100. The UAV 100 comprises a cleaning implement 120. The UAV 100 comprises a controller 125 communicatively coupled to the camera 105, the liquid dispenser 115 and the cleaning implement 120. The controller 125 is operable to cause the liquid dispenser 115 to dispense liquid from the liquid container 110 onto the portion of the vehicle 200 to be cleaned. The controller 125 is operable to control the cleaning implement 120 to clean the portion of the vehicle 200 to be cleaned. The liquid may comprise waterless carwash liquid. By using waterless carwash liquid, as opposed to water and/or non-waterless carwash liquid, a relatively small liquid container can be used compared to a water-based cleaning solution. This makes UAV-based vehicle cleaning more practical, environmentally friendly and/or efficient. Environmental friendliness may be enhanced, compared to water-based cleaning techniques, where run-off can be reduced and/or avoided. Such run-off may contain environmentally unfriendly chemicals, toxins etc. Such UAV-based vehicle cleaning may also be less time-consuming than a water-based cleaning solution, particularly, but not exclusively, in view of the amount of time involved in preparing for water-based cleaning. Such preparation time may involve gathering cleaning equipment for cleaning the vehicle 200, wetting the vehicle 200, applying cleaning liquid, washing off the cleaning liquid, drying the vehicle 200, putting the cleaning equipment away etc. Further, the vehicle 200 may still be cleaned when water is scarce and/or when restrictions on water usage are in place. Clean water may temporarily or permanently be unavailable, for example because of a hot climate location, a remote location away from clean water sources, weather conditions etc. Even where clean water is available, there may be permanent or temporary restrictions on water usage. For example, a temporary hosepipe ban may be in place in particularly hot weather.

The volume of the liquid container 110 may be insufficient to contain an amount of water required to clean the vehicle 200 using non-waterless carwash liquid. Since a relatively small amount of waterless carwash liquid may be used to clean the vehicle 200 compared to using non-waterless carwash liquid, a more compact liquid container 110 can be provided. This can increase efficiency of the UAV 100 compared to use of a larger liquid container 110.

The liquid container 110 may be arranged to store at most 5 litres of liquid. The liquid container 110 may be sized to enable the UAV 100 to clean a relatively large number of vehicles and/or relatively large vehicles, but still using a smaller volume of liquid than generally used to clean a car using a non-waterless carwash liquid solution.

The liquid container 110 may be arranged to store at least 150 millilitres of liquid. As such, the UAV 100 may be able to clean a typical car without needing the liquid container 110 to be refiled during cleaning. This may reduce cleaning time, compared to a scenario in which the liquid container 110 is refiled during cleaning.

The liquid container 110 may be arranged to store at most 500 millilitres of liquid. As such, the UAV 100 may be able to clean multiple typical cars and/or a relatively large car without needing the liquid container 110 to be refiled during cleaning.

The cleaning implement 120 may comprise microfiber cloth. A microfiber cloth is a particularly effective synthetic product for collecting dirt particles where waterless carwash liquid is used.

The cleaning implement 120 may comprise terrycloth. A terrycloth is particularly effective natural product for collecting dirt particles where waterless carwash liquid is used.

The cleaning implement 120 may have a weight of at least 300 Grams per Square Metre. This provides relatively high cleaning efficiency and relatively low risk of damage to paintwork compared to using a lower-weight cleaning implement.

The controller 125 may be configured to control the cleaning implement 120 to clean the portion of the vehicle 200 onto which the liquid is dispensed before the liquid dries on the portion of the vehicle 200. This may provide particularly effective cleaning in terms of the ability for the cleaning implement 120 to pick up dirt particles while the liquid is still present on the portion of the vehicle 200. An alternative may be for the UAV 100 to dispense liquid over the entire vehicle 200 and then clean the vehicle 200, but this may be less effective since the liquid may already have dried when the UAV 100 comes to use the cleaning implement 120.

The controller 125 may be configured to control the cleaning implement 120 to clean the portion of the vehicle 200 using linear cleaning motion. Using linear motion may comprise using linear cleaning motion in one direction of motion only, rather than linear motion in multiple directions. Linear motion may reduce the risk of damage to paintwork compared to using circular motion.

The waterless carwash liquid may comprise silicone-free waterless carwash liquid. This may result in a relatively high-quality finish and relatively low risk of future degradation of paintwork owing to use of a silicone-based waterless carwash liquid.

The waterless carwash liquid may comprise VOC-compliant waterless carwash liquid. This may result in a relatively environmentally friendly vehicle-cleaning solution.

The controller 125 may be configured to cause the UAV 100 to blow air over the portion of the vehicle 200 to be cleaned to cool the portion of the vehicle 200 to be cleaned prior to causing the liquid dispenser 115 to dispense the liquid from the liquid container 110 onto the portion of the vehicle 200 to be cleaned. By cooling the portion of the vehicle 200, the evaporation time of the liquid may be increased. This may provide more effective cleaning since more liquid may be present on the vehicle 200 when the cleaning implement 120 is used.

The UAV 100 may be configured to clean the vehicle 200 in cooperation with at least one further UAV. This may result in more efficient cleaning of the vehicle 200 since the task of cleaning the vehicle 200 may be divided amongst multiple UAVs. The UAVs may have one or more respective specialities. For example, one UAV may be designed or optimised to clean bodywork of the vehicle 200, another UAV may be designed or optimised to clean the wheels of the vehicle 200, another UAV may be designed or optimised to clean an interior of the vehicle 200 etc.

The UAV 100 may be configured to transmit data to the at least one further UAV and/or to receive data from the at least one further UAV in association with the cleaning of the vehicle 200. The UAVs that collectively clean the vehicle 200 may coordinate between each other to clean the vehicle 200. This may be especially effective where the UAVs operate autonomously, without human operator input, so that the UAVs may coordinate their respective efforts.

The UAV 100 may be configured to receive location data indicating a location of the vehicle 200 and to fly to the indicated location of the vehicle 200 based on the received location data. The UAV 100 may reliably pinpoint the location of the vehicle 200 so that the vehicle 200 can reliably be cleaned. Depending on the accuracy of the location data, number of vehicles in the vicinity of the vehicle 200 in question etc., the location data alone may be sufficient to enable to the UAV 100 to identify the vehicle 200 concerned. The UAV 100 may receive the location data from the vehicle 200. For example, where the vehicle 200 is an autonomous vehicle, the autonomous vehicle may transmit its location, directly and/or indirectly, to the UAV 100. Alternatively or additionally, the location data may be obtained from an entity associated with the vehicle 200 (for example an owner of the vehicle 200) and/or an entity associated with the UAV 100 (for example an owner of the UAV 100). The entity associated with the vehicle 200 may identify the location of the vehicle 200 by placing a pin on a digital map in a location corresponding to that of the vehicle 200. A driver of the vehicle 200 may set a location of the vehicle 200 when they park the vehicle 200 to help them remember the location of the vehicle 200. Such a set location may be provided to the UAV 100 to enable to the UAV 100 to locate the vehicle 200. An option to have the vehicle 200 cleaned may be provided within the digital map. For example, where a driver of the vehicle 200 has an option to set a parking location of the parked vehicle 200, the driver may also be provided with an option to have the vehicle 200 cleaned. This may reduce the amount of user interaction involved in having the vehicle 200 cleaned compared, for example, to the user having to access a different software function (e.g. a different software application) to initiate vehicle-cleaning.

In some examples, the location of the UAV 100 is provided to one or more entities. Examples of such entities include, but are not limited to, an entity associated with the UAV 100, an entity associated with the vehicle 200 etc. For example, an owner of the vehicle 200 may track the location of the UAV 100 to verify that the UAV 100 is in the location of the vehicle 200 at a designated cleaning time, that the UAV 100 is en route prior to cleaning etc.

In some examples, the location of the UAV 100 is restricted from being provided to one or more entities. Examples of such entities include, but are not limited to, an entity associated with the UAV 100, an entity associated with the vehicle 200 etc. For example, an owner of the vehicle 200 may be restricted from seeing the location of the UAV 100. This may enhance security of the UAV 100. If the location of the UAV 100 were readily visible, such a UAV 100 may be at risk of unauthorised interception, interference, tampering etc. In some examples, the location of the UAV 100 is restricted from being provided to one or more entities while one or more criteria are met (and/or when one or more other criteria are not met). Examples of such criteria include, but are not limited to, the UAV 100 being en route to cleaning the vehicle 200, the UAV 100 flying away from the vehicle 200 after having cleaned the vehicle 200, the UAV 100 not currently cleaning the vehicle 200 or another vehicle and being available for vehicle-cleaning. The location of the UAV 100 may, however, be provided to one or more entities when the one or more criteria are not met (and/or when one or more other criteria are met). For example, the location of the UAV 100 may be provided to an entity associated with the vehicle 200 when the UAV 100 is at the location of the vehicle 200 to provide a degree of assurance that the vehicle 200 is about to be cleaning, is being cleaned and/or has been cleaned.

The UAV 100 may be configured to receive identification data indicating an identity of the vehicle 200 and to identify the vehicle 200 based on the received identification data. The identification data may identify the make, model, colour, and/or registration number etc. of the vehicle 200. The UAV 100 may therefore reliably identify the particular vehicle that is to be cleaned. Where, for example, an entity associated with the vehicle 200 has paid for the vehicle 200 to be cleaned, the UAV 100 can enable the correct vehicle to be cleaned in view of the payment for the cleaning of the vehicle 200.

In some examples, the UAV 100 receives payment authorisation from the vehicle 200 itself. As such, the vehicle 200 itself can pay for the cleaning performed by the UAV 100. This may be effective where the vehicle 200 operates autonomously and can authorise payments itself.

The UAV 100 may be configured to receive a signal identifying the vehicle 200 to be cleaned from the vehicle 200 itself. For example, the vehicle 200 may flash its headlights lights in a particular manner, sound its horn, etc to signal to the UAV 100 that it is the vehicle 200 to be cleaned. This may be provided where the vehicle 200 is an autonomous vehicle, or otherwise.

The UAV 100 may be configured to transmit and/or receive vehicle unlock data and to cause the vehicle 200 to be unlocked based on the received and/or transmitted vehicle unlock data. The vehicle unlock data may comprise a temporary token which, when provided to the vehicle 200, causes the vehicle 200 to unlock. The temporary token may be valid for the duration of the cleaning of the vehicle 200 only, or otherwise. Unlocking the vehicle 200 may comprise one or more components of the vehicle 200 being unlocked.

The UAV 100 may be configured to transmit and/or receive vehicle lock data and to cause the vehicle 200 to be locked based on the received and/or transmitted vehicle lock data. The vehicle lock data may comprise a temporary token which, when provided to the vehicle 200, causes the vehicle 200 to lock. The temporary token may be valid for the duration of the cleaning of the vehicle 200 only, or otherwise. The UAV 100 may thereby be able to cause the vehicle 200 to be locked in response to a vehicle-lock trigger. Examples of vehicle-lock triggers include, but are not limited to, completion of cleaning the vehicle 200, completing of cleaning the interior of the vehicle 200, presence of an unauthorised person near to the vehicle 200 etc. Locking the vehicle 200 may comprise one or more components of the vehicle 200 being locked.

The UAV 100 may be configured to transmit and/or receive vehicle premises access data and to access premises where the vehicle 200 is located based on the received and/or transmitted vehicle premises access data. Examples of such premises include, but are not limited to, garages, secure parking locations, etc. The premises may be private or public. The premises may be commercial or residential. The vehicle premises access data may comprise a temporary token which enables the UAV 100 to access the premises in which the vehicle 200 is located. The temporary token may be valid for the duration of the cleaning of the vehicle 200 only, or otherwise.

The UAV 100 may be configured to transmit identification data to the vehicle 200. The vehicle 200 may be able to detect the UAV 100 and, if expected identification data is not provided, to perform a predetermined action. The identification data may comprise a registration identifier of the UAV 100. The registration identifier may be an identifier allocated by a central registration authority for UAVs. Examples of such predetermined actions include, but are not limited to, sounding a horn, activating an alarm, flashing headlights, driving to a different location, recording image data of the UAV 100 etc. If expected identification data is provided, the vehicle 200 may act in a different manner, for example by allowing the UAV 100 to clean the vehicle 200. As such the vehicle 200 may self-protect in the case of nearby UAVs.

The UAV 100 may be configured to provide status update report data. Such data may be provided to an entity associated with the vehicle 200 and/or an entity associated with the UAV 100. Providing such data to the entity associated with the vehicle 200 can enable the entity to see that cleaning is underway and may enable the entity to determine when the vehicle 200 will be cleaned, so that the entity can plan accordingly. Providing such data to the entity associated with the UAV 100 can enable the entity to allocate the UAV 100 for cleaning another vehicle, to return to a designated location etc. Such allocation may be manual or automatic.

A remaining time indicator may be provided to an entity associated with the vehicle 200 and/or an entity associated with the UAV 100. The remaining time indicator may be derived using the status update report data or otherwise. Providing the remaining time indicator to the entity associated with the vehicle 200 may, for example enable the entity to determine how long they have to wait until the vehicle 200 is cleaned. The remaining time indicator may be in the form of a countdown timer. Providing the remaining time indicator to the entity associated with the UAV 100 may, for example, assist with logistics.

The UAV 100 may be configured to clean at least part of an interior of the vehicle 200 in response to the unlocking of the vehicle 200. A more extensive cleaning of the vehicle 200 may be conducted where the UAV 100 has access to an interior of the vehicle 200. The UAV 100 may be able to access the interior of the vehicle 200 via a door, window, sunroof etc.

As such, in some examples, the UAV 100 may be configured to clean an exterior of the vehicle 200 only. This may facilitate logistics around cleaning of the vehicle 200 where the UAV 100 does not need to access the interior of the vehicle 200 and may improve security in relation to the vehicle 200. In some examples, the UAV 100 is configured to clean both the exterior and the interior of the vehicle 200. This may provide more comprehensive cleaning of the vehicle 200 than cleaning the exterior of the vehicle 200 only, but involves access to the interior of the vehicle 200. The UAV 100 may be configured to clean the interior of the vehicle 200 only, for example where the interior of the vehicle 200 comprises one or more parts that can be cleaned using waterless carwash, or otherwise. In particular, some vehicles have interior paintwork corresponding to the exterior paintwork of the vehicle, which may be cleaned by the UAV 100.

The portion of the vehicle 200 to be cleaned may be cleaned while the vehicle 200 is stationary. This may provide relatively reliable cleaning of the vehicle 200.

The portion of the vehicle 200 to be cleaned may be cleaned while the vehicle 200 is moving. Where, for example, the vehicle 200 is an autonomous vehicle, the vehicle 200 may be able to be cleaned while it is in motion without impacting the safety of the vehicle 200. This may provide time-efficient cleaning of the vehicle 200, since the vehicle 200 can be cleaned while it is performing another task, namely moving. However, cleaning of other (non-autonomous) types of vehicle while the vehicle is moving may also be possible. For example, a vehicle on private property may be able to be cleaned while the vehicle is in motion, for example where the vehicle is being driven slowly and where there are no other vehicles and/or people present.

In some examples, one or both of the UAV 100 and the vehicle 200 to be cleaned travel to a predetermined location in order for the vehicle to be cleaned by the UAV 100. The predetermined location may be the location of the UAV 100, the location of the vehicle 200 or another location.

As such, the vehicle 200 may travel to a location of the UAV 100 or to another designated location in order to be cleaned. This may be effective where the vehicle 200 is an autonomous vehicle, or otherwise. This may also be effective where the vehicle 200 may be cleaned more efficiently, safely, effectively, quickly, etc. at the location of the UAV 100 and/or at the other designated location. For example, where the vehicle 200 is in an area where people are also present, it may be safer for the vehicle 200 to move (or be moved) safely to another location to be cleaned. This may particularly, but not exclusively, be the case where the UAV 100 would not be able to operate in the location of the vehicle 200 in view of the presence of people in the vicinity of the vehicle 200, for example in view of regulations or otherwise. The designated location may be reserved for UAV-based vehicle cleaning. For example, the designated location may be a designated parking bay in a car park, a designated car park for UAV-based vehicle cleaning etc.

The UAV 100 may be under some degree of control. For example, even where the UAV 100 cleans the vehicle 200 autonomously, the UAV 100 may be requested to clean the vehicle 200 under the control of another entity. Such control may occur in various different ways. In some examples, the control may be provided via a computing device of an entity associated with the vehicle 200. The computing device may be, but is not limited to being, a tablet computing device, a desktop computing device, a laptop computing device, a smartphone, a wearable computing device, a smart television, an in-vehicle control system, an in-vehicle entertainment system. The control may be provided via a dedicated software application (also known as an "app"), via a dedicated website accessible via a web browser etc. The entity associated with the vehicle 200 may, for example, be able to select one or more cleaning options in real-time, while the vehicle 200 is being cleaned. For example, the entity associated with the vehicle 200 may be able to select one or more portions of the vehicle 200 to be cleaned. Such selection may be performed, for example, by touching a region of a touch-screen display representing the one or more portions of the vehicle 200. The one or more portions of the vehicle 200 may be represented using image data captured by the UAV 100, a computer-generated representation of the vehicle 200 etc. The entity associated with the vehicle 200 may be able to zoom in on image data captured by the UAV 100. For example, the entity may be able to get a clearer view of the level of dirtiness of the vehicle 200 in this way and determine whether or not the vehicle 200, or at least one or more regions of the vehicle 200, should be cleaned. Such control may be performed while the entity is in the vehicle 200. For example, the entity associated with the vehicle 200 may be able to summon the UAV 100 using an in-vehicle entertainment system.

Metrics related to vehicle-cleaning performed by the UAV 100 may be collected. Examples of such metrics include, but are not limited to, time spent cleaning, time not spent cleaning, amount of cleaning liquid used, amount of cleaning liquid saved by using waterless carwash instead of non-waterless carwash, etc. Data useable to derive such metrics may be reported by the UAV 100, or otherwise.

In some examples, a kit is provided to enable a UAV that does not operate in accordance with examples described herein to operate in accordance with examples described. Such a kit may be retrofitted to an existing UAV to provide a UAV 100 with at least some of the enhanced functionality described herein. The kit may be permanently or temporarily fitted to the UAV. The kit may comprise physical and/or software elements.

In some examples, the UAV 100 is provided with one or more cleaning indications related to cleaning of the vehicle 200. The one or more cleaning indications may be provided by an entity associated with the vehicle 200, an entity associated with the UAV 100 or otherwise. Examples of cleaning indications include, but are not limited to, one or more parts of the vehicle 200 that are not to be cleaned, the presence of bird droppings, the presence of tree sap, the presence of heavy soiling, the vehicle 200 being a convertible vehicle having its roof down when the vehicle 200 will be cleaned etc. Knowledge of such indications by the UAV 100 can enable the UAV 100 to clean the vehicle 200 more effectively than if such indications were not known to the UAV 100.

Restrictions may be in place in relation to where and how the UAV 100 can be used. Such restrictions may be set by aviation authorities, for example, and can vary between different countries and even regions of countries. Possible restrictions include, but are not limited to, the UAV 100 not being used within a given distance (for example 50 metres) of people, the UAV 100 not being used within a given distance (for example 50 metres) of private property, the UAV 100 not flying over private property, the UAV 100 not being used near airports, etc. A UAV 100 in accordance with examples described herein may still be used even where such restrictions are in place in some instances. For example, the UAV 100 may be used for cleaning vehicles in rural locations at a residence with no nearby neighbours or members of the public. In some examples, an entity may authorise the UAV 100 to bypass one or more restrictions. For example, an owner of a private property may authorise the UAV 100 to be allowed onto the private property to clean a vehicle there. An owner and/or operator of an airport car park (for example a long-stay or short-stay car park) may authorise the UAV 100 to clean vehicles in the car park, even where the car park is within airport facilities. Operation of the UAV 100 may nevertheless be restricted in such scenarios. For example, in the case of the airport car park, geofencing may be applied such that the UAV 100 is restricted from leaving the airport car park and/or cannot fly above a predetermined threshold height etc. In some examples, a licence may be granted for one or more such regulation not to be applied. For example, an aviation authority may enable licensed UAVs, licensed UAV operators etc, to bypass at least one restriction. In other examples, no applicable restrictions apply to operating the UAV 100 in accordance with the examples described herein.

The UAV 100 may be configured to stop cleaning the vehicle 200 in response to a predetermined stop-cleaning-trigger. The UAV 100 may stop cleaning the vehicle 200 temporarily, or may abort cleaning the vehicle 200 altogether. The UAV 100 may resume cleaning the vehicle 200 after stopping cleaning the vehicle 200 temporarily or otherwise. Examples of such stop-cleaning-triggers include, but are not limited to, detecting an unexpected person, animal etc nearby, predetermined weather conditions (for example rain, wind etc.), a return-to-home message (for example from an entity associated with the UAV 100).

Various measures (for example UAVs, methods, controllers, and computer programs) are provided in which a UAV 100 is controllable to clean an object (for example a vehicle 200 or otherwise) autonomously. The UAV 100 comprises a controller 125 operable to cause a liquid dispenser 115 associated with the UAV 100 to dispense liquid (for example waterless carwash liquid or otherwise) from a liquid container 110 of the UAV 110 onto a portion of the object to be cleaned. The controller 125 is operable to control a cleaning implement 120 of the UAV 100 to clean the portion of the object onto which the liquid is dispensed. The liquid dispenser 115 being associated with the UAV 100 may involve the liquid dispenser 110 being comprised in the UAV 110 or being separate from, but useable with, the UAV 100. As such, the UAV 100 may be used to provide a liquid to be used to clean an object and to clean the object using a cleaning implement 120.

Various measures (for example UAVs, methods, controllers, and computer programs) are provided in which waterless carwash liquid is added to a liquid container 110 of a UAV 100. As such, the UAV 100 can be used to clean a vehicle 200, for example in the manner described herein. The waterless carwash liquid may be added to the liquid container 110 of the UAV 110 by a person, by an automated refilling station, etc.

Various measures (for example UAVs, methods, controllers, and computer programs) are provided in which a vehicle 200 is cleaned and in which a UAV 100 is used to dispense waterless carwash liquid onto the vehicle 200. As such, the UAV 100 can be used to clean a vehicle 20, for example in the manner described herein.

Various measures (for example UAVs, methods, controllers, and computer programs) are provided in which a UAV 100 comprises a controller 125 operable to cause the UAV 100 to clean a vehicle 200 autonomously by autonomously causing a liquid dispenser 115 of the UAV 100 to dispense liquid from a liquid container 110 associated with the UAV 100 onto a portion of the vehicle 200 to be cleaned and by autonomously controlling a cleaning implement 120 of the UAV 100 to clean the portion of the vehicle 200 onto which the liquid is dispensed. As such, the vehicle 200 can be cleaned efficiently, without being controlled directly by another entity.

Various measures (for example UAVs, methods, controllers, and computer programs) are provided in which a UAV 100 comprises a liquid container 110 comprising waterless carwash liquid. As such, a vehicle 200 can be cleaned more effectively using the UAV 100 as described herein.

Various modifications and alternatives will be apparent to one skilled in the art.

What is claimed is:

1. An unmanned aerial vehicle, UAV, comprising:
   a camera having a field of vision including, in use, a portion of a vehicle to be cleaned;
   a liquid container comprising liquid;
   a liquid dispenser operable to cause the liquid comprised in the liquid container to be dispensed from the liquid container;
   a cleaning implement; and
   a controller communicatively coupled to the camera, the liquid dispenser and the cleaning implement and operable to:
     cause the liquid dispenser to dispense the liquid from the liquid container onto the portion of the vehicle to be cleaned; and
     control the cleaning implement to clean the portion of the vehicle to be cleaned, wherein the controller of the UAV is configured to:
   receive and/or transmit vehicle unlock data and to cause the vehicle to be unlocked based on the vehicle unlock data; and
   cause the UAV to clean at least part of an interior of the vehicle in response to the unlocking of the vehicle.

2. The UAV of claim 1, wherein the controller is configured to cause the UAV to blow air over the portion of the vehicle to be cleaned to cool the portion of the vehicle to be cleaned prior to causing the liquid dispenser to dispense the liquid from the liquid container onto the portion of the vehicle to be cleaned.

3. The UAV of claim 1, wherein the liquid container is arranged to store at most 5 litres of liquid.

4. The UAV of claim 1, wherein the liquid container is arranged to store at least 150 millilitres of liquid.

5. The UAV of claim 1, wherein the liquid container is arranged to store at most 500 millilitres of liquid.

6. The UAV of claim 1, wherein the cleaning implement has a weight of at least 300 Grams per Square Metre.

7. The UAV of claim 1, wherein the controller is configured to control the cleaning implement to clean the portion of the vehicle onto which the liquid is dispensed before the liquid dries on the portion of the vehicle.

8. The UAV of claim 1, wherein the liquid comprises silicone-free waterless carwash liquid and/or VOC-compliant waterless carwash liquid.

9. The UAV of claim 1, wherein the UAV is configured to clean the vehicle in cooperation with at least one further UAV.

10. The UAV of claim 9, wherein the UAV is configured to transmit data to the at least one further UAV and/or to receive data from the at least one further UAV in association with the cleaning of the vehicle.

11. The UAV of claim 1, wherein the UAV is configured to receive location data indicating a location of the vehicle and to fly to the indicated location of the vehicle based on the received location data.

12. The UAV of claim 1, wherein the UAV is configured to receive identification data indicating an identity of the vehicle and to identify the vehicle based on the received identification data.

13. The controller of the UAV of claim 1, wherein the UAV is configured to receive and/or transmit vehicle lock data and to cause the vehicle to be locked based on the vehicle lock data.

14. The UAV of claim 1, wherein the portion of the vehicle to be cleaned is cleaned while the vehicle is stationary.

15. The UAV of claim 1, wherein the portion of the vehicle to be cleaned is cleaned while the vehicle is moving.

16. An unmanned aerial vehicle, UAV, comprising:
a controller operable to cause the UAV to clean a vehicle autonomously by:
autonomously causing a liquid dispenser of the UAV to dispense liquid from a liquid container associated with the UAV onto a portion of the vehicle to be cleaned; and
autonomously controlling a cleaning implement of the UAV to clean the portion of the vehicle onto which the liquid is dispensed,
wherein the controller of the UAV is configured to:
receive and/or transmit vehicle unlock data and to cause the vehicle to be unlocked based on the vehicle unlock data; and
autonomously cause the UAV to clean at least part of an interior of the vehicle in response to the unlocking of the vehicle.

17. An unmanned aerial vehicle, UAV, comprising a controller of the UAV configured to cause a vehicle to be unlocked and cause the UAV to clean at least part of an interior of the vehicle in response to the unlocking of the vehicle.

18. The UAV of claim 1, wherein the carwash liquid comprises waterless carwash liquid.

* * * * *